Figure 1A:
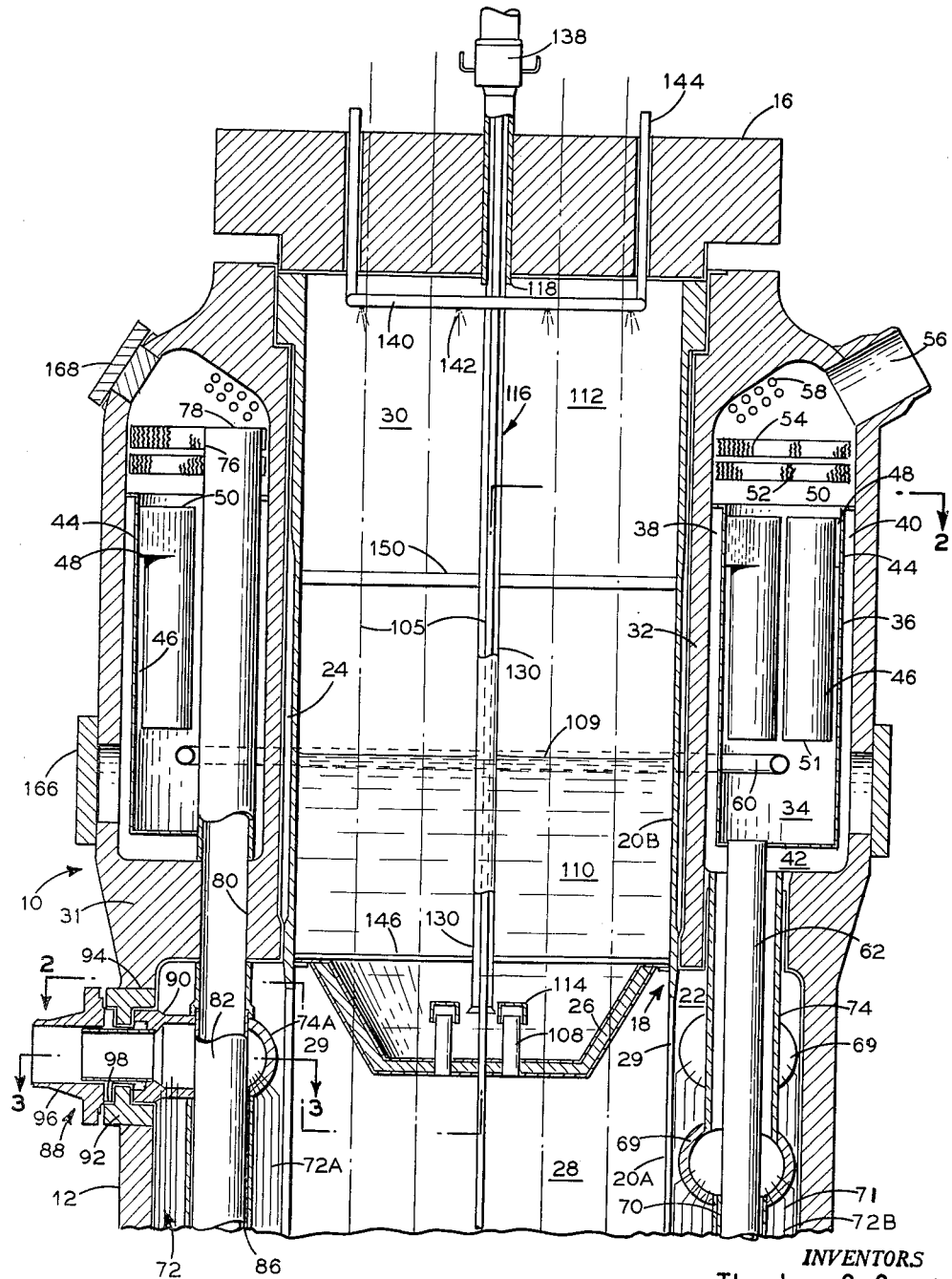

April 12, 1966   J. H. AMMON ETAL   3,245,881
INTEGRAL BOILER NUCLEAR REACTOR
Filed July 31, 1962   5 Sheets-Sheet 1

INVENTORS
Theodore S. Sprague
Johannes H. Ammon
BY
ATTORNEY

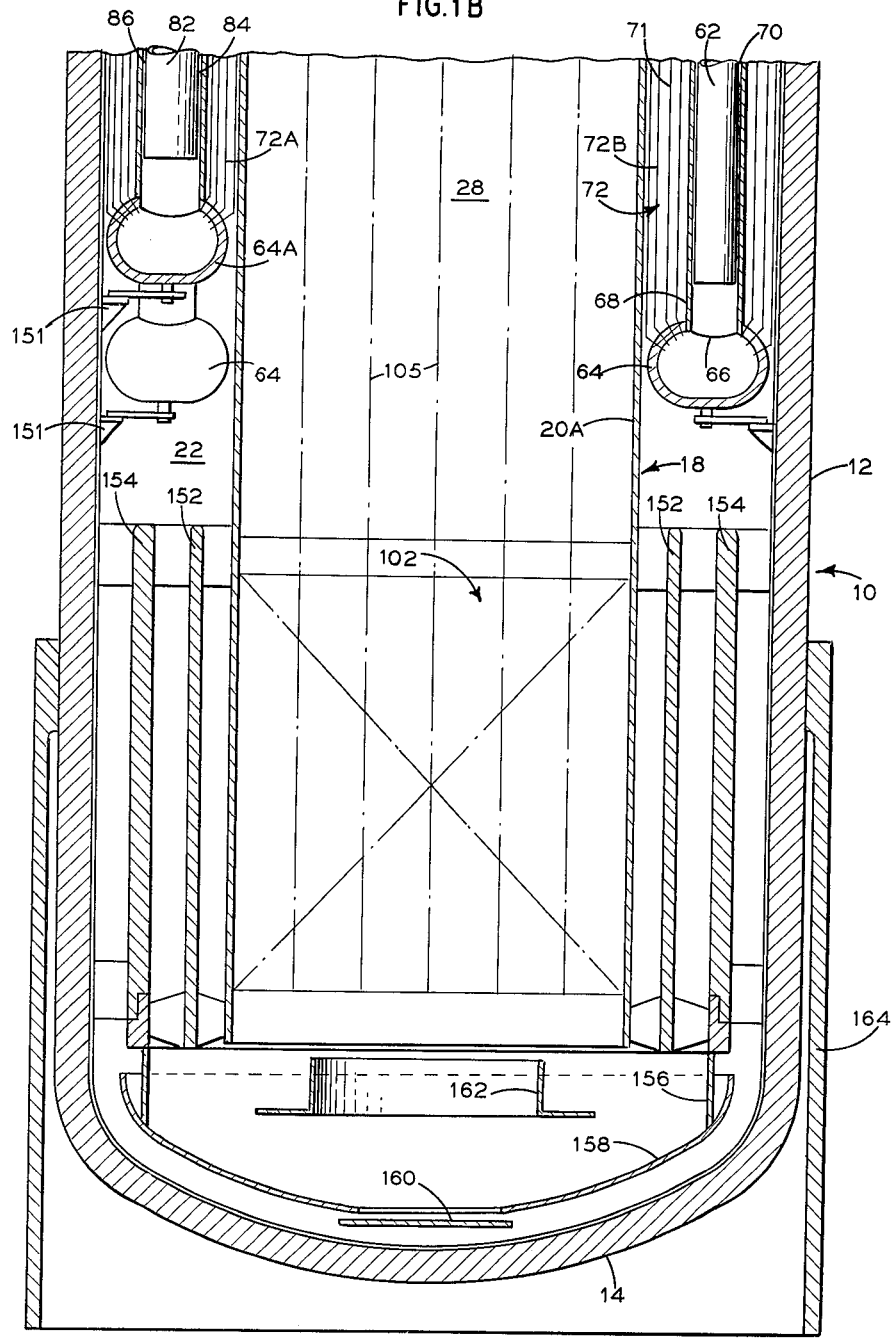

April 12, 1966    J. H. AMMON ETAL    3,245,881
INTEGRAL BOILER NUCLEAR REACTOR
Filed July 31, 1962    5 Sheets-Sheet 4

April 12, 1966 J. H. AMMON ETAL 3,245,881
INTEGRAL BOILER NUCLEAR REACTOR
Filed July 31, 1962 5 Sheets-Sheet 5

United States Patent Office 3,245,881
Patented Apr. 12, 1966

3,245,881
INTEGRAL BOILER NUCLEAR REACTOR
Johannes H. Ammon, Akron, and Theodore S. Sprague, Hudson, Ohio, assignors to The Babcock & Wilcox Company, New York, N.Y., a corporation of New Jersey
Filed July 31, 1962, Ser. No. 213,637
32 Claims. (Cl. 176—53)

This invention relates to nuclear reactor systems, and more particularly to a compact arrangement which incorporates the various pieces of equipment of reactor systems within a single vessel.

Up until the present time the steam generating portion of nuclear power plants has been composed of a number of separate pieces of equipment. This has been true both for the large central station type electric generating plants as well as for smaller plants which are used for ship propulsion or as power sources at remote locations. The usual arrangement has had the nuclear reactor tied to one or more separate heat exchangers by means of appropriately arranged piping and in addition included circulating pumps, valves and other auxiliary equipment. Heat generated within the reactor was transported through the connecting piping for interchange within the heat exchanger by means of a primary coolant. Within the heat exchanger the primary coolant transfers its heat to a secondary coolant and normally is recycled back to the reactor. In addition, the heat exchanger may have vapor separating equipment disposed within its shell or in another separate unit. In pressurized water reactors the primary coolant system also includes a separate pressurizer, in which a vapor space is maintained in equilibrium by the alternate use of electrical heating and spray cooling as the transients of the system demand, to assure that the coolant does not boil.

Because of the nature of the various pieces of equipment which make up a nuclear power plant it has been most difficult to provide a compact arrangement. This feature of compactness is important, not only in propulsion plants and those plants situated at remote locations, but also in the large central station plants. Due to safety requirements the reactor and its auxiliary equipment in all nuclear power plants must be enclosed within a containment vessel which, in view of the number and size of the separate units in present plants is quite large. However, by providing a compact nuclear power plant the size of the containment will be reduced and other advantages achieved. Further, the total cost of the plant will be considerably reduced by constructing a compact plant.

It is, therefore, the primary object of this invention to provide a compact integral boiler reactor design which in corporates the reactor, the heat exchanger and is associated vapor-liquid separating equipment within one vessel.

Another object of the invention is to provide a pressurized integral boiler reactor incorporating a pressurizer within the vessel.

Still another object of the invention is to provide an integral boiler reactor in which both vapor generating and vapor superheating can be accomplished within a single containment vessel.

A further object of the invention is to provide within a single unit covection surface arranged for both vapor generating and vapor superheating, with necessary vapor-liquid separating equipment.

Yet another object of the invention is to provide a reactor arrangement wherein decay heat can be removed after the reactor has been shutdown.

The present invention thus provides a vessel within which the primary coolant continuously circulates, absorbing the heat generated in a nuclear core and giving up the heat to a secondary coolant flowing through a multiplicity of tubes also located within the same vessel. The interior of the vessel is divided into a riser space, a pressurizer space, a downcomer or heat exchange space and a vapor-liquid separating space. Heaters are arranged within the pressurizer space to vaporize a quantity of primary coolant and in the process pressurize it to the desired level. The core is positioned in the lower part of the riser space. By means of a controlled fission type chain reaction heat generated within the core is removed by the primary coolant which then flows upwardly through the riser space. From the riser space the primary coolant flows downwardly transferring it heat to the secondary coolant within the tubes in the downcomer space. Within the tubes the secondary coolant can be vaporized or superheated. Separating equipment, positioned within the vapor-liquid separating space receives the steam-water mixture of secondary coolant from the tubes, providing separated vapor to be superheated within in certain of the tubes and separated liquid to be recycled through the remainder of the tubes.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
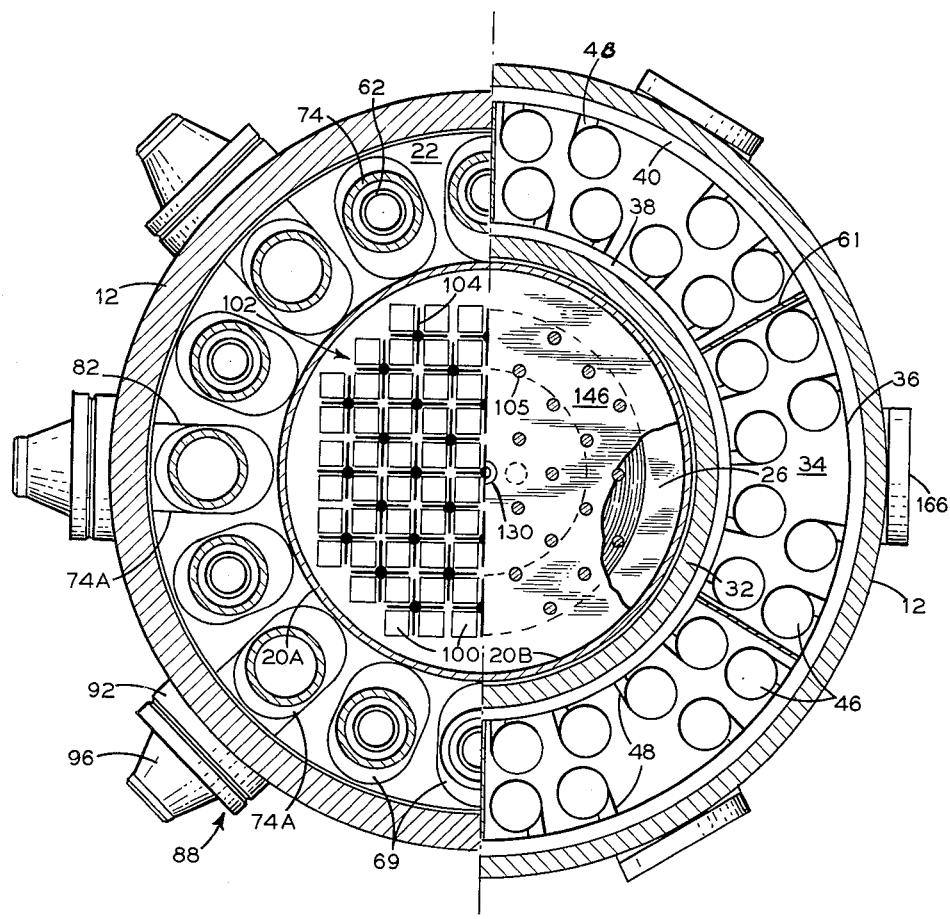
Figure 3:
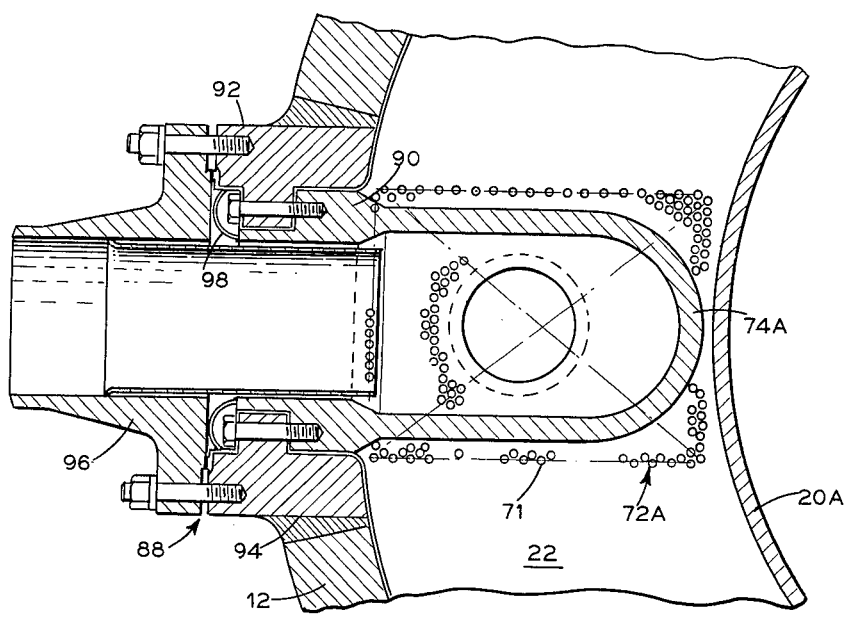
Figure 4A:
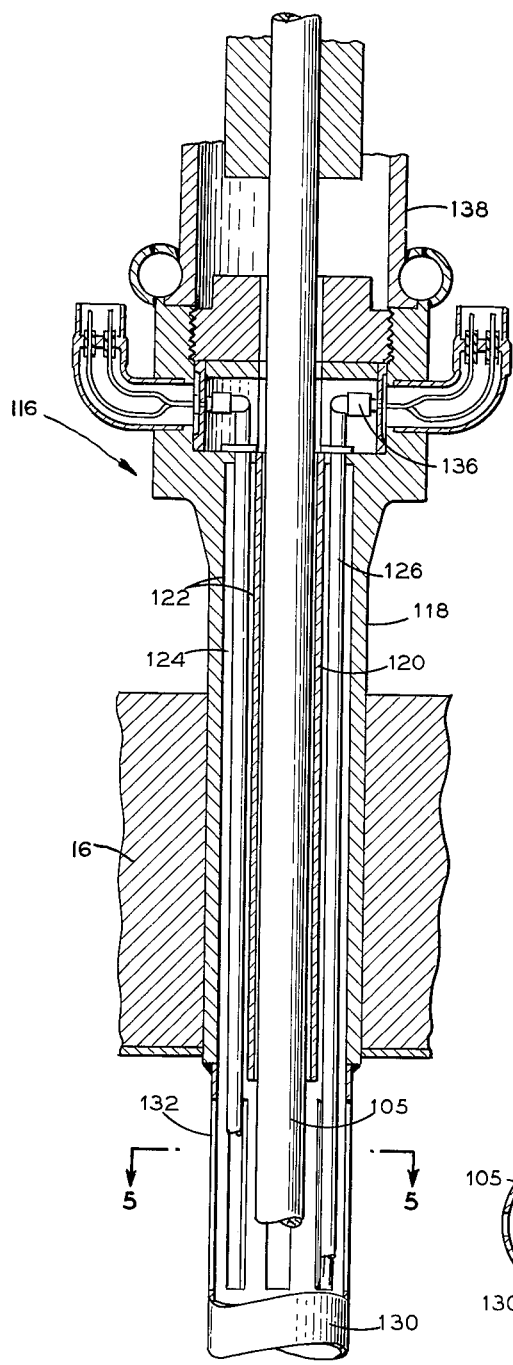
Figure 4B:
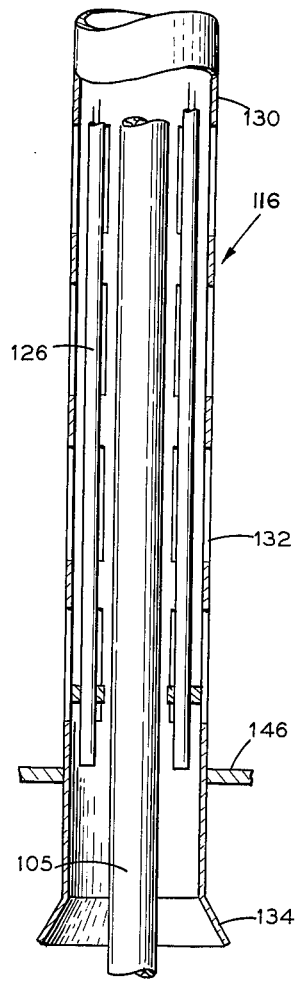
Figure 5:
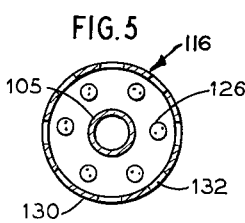

Of the drawings:
FIGS. 1A and 1B show vertical sections through the upper and lower halves, respectively, of one embodiment of an integral boiler reactor incorporating the present invention;
FIG. 2 is a horizontal section taken along line 2—2 in FIG. 1A;
FIG. 3 is an enlarged horizontal section taken along lines 3—3 in FIG. 1A;
FIGS. 4A and 4B show vertical views partly in section of the upper and lower halves, respectively, of a heater assembly disposed within the pressurizer space of the reactor shown in FIG. 1A; and
FIG. 5 is a horizontal section taken along lines 5—5 in FIG. 4A.

This invention is concerned with a pressurized water reactor of the general type illustrated and described in the copending application Serial No. 145,012, filed October 9, 1961 in the name of M. F. Sankovich by the common assignee. Moreover, the present invention is an improvement over the arrangement illustrated and described in application Serial No. 51,044, filed August 22, 1960 by the present inventors, now abandoned.

In FIGS. 1A and 1B there is shown an integral boiler reactor 10 disposed within a vertically elongated pressure vessel 12. The vessel 12 is closed at its lower end by an ellipsoidal or similarly curved lower head 14 which is an integral part of the vessel and its upper end by a removable flat closure member 16. Preferably the closure member is attached to the vessel by means of bolts or studs (not shown). While the closure member has been shown as flat, an arrangement which reduces the over-all height of the unit, it could also be curved or elliptical in cross section as is shown in the above-mentioned application Serial No. 145,012.

Arranged within the vessel 12 and concentric therewith is a cylindrically shaped wall means or barrel 18 which extends vertically from a plane closely spaced above the lower end of the vessel to the closure member 16 of the vessel. The barrel 18 is divided into a lower section 20A and an upper section 20B. The lower section 20A of the barrel 18 is spaced from the vessel forming therewith a downcomer space 22, while its upper section 20B contacts the pressure vessel for a portion of its height and for another portion it is closely spaced from the vessel wall forming an annular shaped stagnant steam space 24.

The interior of the barrel 18 is divided by a horizontally disposed baffle 26 into a lower riser chamber 28 and an upper pressurizer space 30. To minimize heat transfer from the pressurizer space to the riser chamber the baffle 26 is insulated. Without the insulation it would be difficult to maintain the temperature differential between the pressurizer space and riser chamber which prevents the primary coolant from vaporizing. Openings 29 are formed in the upper end of the lower section 20A of the barrel 18 to provide communication between the riser chamber and the downcomer space.

Above the downcomer space 22 the wall thickness of the pressure vessel 12 is increased and forms in effect a tube sheet 31. Spaced inwardly from the vessel wall a second wall 32 extends upwardly from the tube sheet 31 and joins the vessel wall at its upper end forming in combination therewith an annular shaped separation space 34.

Within the separation space 34 and set away from the wall of the pressure vessel 12 and the second wall 32 is a ring shaped container 36 closed at its base and open at its top. Annular shaped inner and outer flow passageways 38 and 40, respectively, are formed between the walls of the container and of the pressure vessel. At its upper end the container is attached to the walls of the pressure vessel closing off the top of the flow passageways 38, 40. Between the lower end of the container 36 and the tube sheet 31 is a flow passageway 42 common to both the inner and outer flow passageways 38, 40.

Closely spaced below the top the the container 36 are a number of openings 44 in its inner and outer walls. Positioned within the container are a number of vertically arranged whirl chamber type vapor-liquid separators 46 having inlet ducts 48 connected to the openings 44 and communicating with one of the flow passageways 38, 40. Each separator 46 has a vapor outlet 50 at its upper end and a liquid outlet 51 at its lower end. Ring shaped corrugated plate scrubber elements 52 and 54, in vertically spaced arrangement, are positioned above the top of the container 36. A saturated vapor outlet 56 from the separation space 34 is disposed above the scrubber elements. Also within the separation space above the scrubblers are a number of condenser tubes 58. Beneath the separators 46 in the container 36 is a ring shaped feedwater inlet pipe or header 60. A number of suitably disposed upright plates 61 divide the interior of the container into separate compartments.

Attached to the base of the container is a duct 62 which extends downwardly into the downcomer space 22. At its lower end the duct is spaced above a lower header 64, and as shown in FIG. 1B the lower header has an oval shaped cross section. The header has an opening 66 in its top into which is connected a sleeve 68, which extends upwardly through the downcomer space and is connected at its upper end to the lower face of an upper header 69. Both the upper and lower headers are of the same oval shape. Each of the sleeves 68 encloses one of the ducts 62 and is spaced closely from it to form a narrow annular space 70 therebetween.

As can be seen in both FIGS. 1A and 1B, there are a number of spaced pairs of upper and lower headers positioned within the downcomer space, each pair being suitably connected by a plurality of vertically arranged tubes 71. By referring to FIG. 2 it can be noted that there are sixteen headers, the half section shows eight, to which sixteen bundles 72 of tubes 71 are connected within the downcomer space 22. Three of the tube bundles 72A are arranged for superheating vaporized secondary coolant while the remaining tube bundles 72B are provided to vaporize secondary coolant flowing through them. The adjacent tube bundles and headers are staggered vertically to avoid obstructing coolant flow through the downcomer.

Extending from the top of each upper header 69 is a conduit or tube 74 which passes through the tube sheet 31 and is in communication with the flow passageway 42. The tubes 74 are in axial alignment with and enclose the respective ducts 62 above the upper headers 69.

While the vapor generating tube bundles 72B are connected to the container 36 by means of the duct 62, the superheating tube bundles 72A communicate with the separation space 34 by means of a pipe 76. An inlet 78 to the pipe 76 is located in the upper region of the separating space 34 so that vapor must pass through the scrubbers 52, 54 before it enters the inlet 78. At its opposite end the pipe 76 extends downwardly to the bottom of the separation space where it is connected to an opening 80 in the tube sheet 31. A pipe 82 attached to the lower face of the tube sheet, in alignment with the opening 80, extends downwardly into the downcomer space terminating in a plane closely spaced above the lower header 64A. Between the lower header 64A and an upper header 74A the pipe 82 is enclosed by a sleeve 84 which is connected, at its opposite ends, into the upper and lower headers. This sleeve 84 is concentric with an closely spaced from the pipe 82 providing a narrow annular space 86 between the two.

As illustrated in FIG. 3 the upper header 74A comprises a superheated vapor outlet assembly 88 having a flange 90 formed integrally with the upper header 74A. Bolt connected to the flange 90, as shown in FIG. 3, is a collar 92 secured within an opening 94 in the pressure vessel wall 12. A second outlet flange 96 is positioned on the exterior of the pressure vessel and is bolt connected to the collar 92. To prevent the escape of primary coolant from the downcomer space a seal membrane 98 is welded across the joint between the collar 92 and the flange 90 on the header 74A.

As shown in FIG. 2 within the barrel 18 at the lower end of the riser chamber 28 a number of vertically elongated fuel element assemblies 100 are arranged to form a core 102, with a plurality of control rods 104 positioned between fuel element assemblies for controlling the fission chain reaction. In FIGURES 1A and 1B the relative positioning of the control rods 104 and their associated drive extensions 105 are generally indicated. These control rods 104 are top mounted with their drive extensions 105 extending upwardly through the riser chamber 28 and pressurizer space 30 and passing through closure member 16. The core 102 is bottom supported by the barrel 18.

Flow of primary coolant between the riser chamber 28 and the pressurizer 30 passes through nozzles 108 which are secured to the baffle 26 and extend upwardly into the lower region of the pressurizer space 30. The pressurizer space is divided by a liquid level 109 into a lower liquid space 110 and an upper vapor space 112. Flow directional hoods 114 are positioned at the openings of the nozzles 108 within the liquid space 110 to direct the flow of the primary coolant therein.

Within the pressurizer space are positioned a number of heater assemblies 116 each of which, as shown in FIG. 5, surrounds a control drive extension 105. Referring to FIGS. 1A and 4A the heater assembly comprises a support nozzle 118 which extends vertically through the closure member 16 and terminates just within the vapor space 112. Spaced inwardly from the nozzle is a guide bushing 120 which also terminates at substantially the same point inside the vapor space as the nozzle. Both the nozzle 118 and the bushing 120 have matching recessed grooves 122 which provide a number of vertically arranged openings 124 extending into the pressurizer space 30. Heater elements 126 extend downwardly through the openings 124 into the pressurizer space and their lower ends are located in a plane closely spaced above the top of the flow directional hoods 114.

The heater elements 126 are of the immersion type and the active portions are located below the liquid level in the pressurizer space. While each heater assembly 116 comprises a number of heater elements 126 arranged about a control rod drive extension, they are in turn enclosed by a perforated sleeve 130 for their full length within the pressurizer space. Openings 132 are arranged in the sleeve 130 both below the liquid level 109 and at the upper end of the sleeve near the closure member to permit flow of the primary coolant into the sleeve in contact with the heaters and for the exit of vapor at the upper end of the sleeve. Each sleeve has a flared inlet 134 at its lower end.

Above the closure member within the support nozzle 118 are heater element couplings 136 which connect the heater elements to their source of electricity. These connections extend outwardly at right angles from the axis of the control rod drive extensions to provide clearance for the remainder of the control rod drive extensions 105 which extend above the reactor. Each support nozzle 118 is connected to a control rod drive mechanism housing 138 which extends upwardly above the reactor.

Preferably the heater elements 126 are positioned about the outer control rod drive extensions 105 so that their connections do not obstruct the operation of the control rod drive extensions above the closure member 16.

A heater support grid 146 is connected to the lower ends of the sleeves 130 to hold them in position within the lower end of the pressurizer space. In addition, a lattice or similar structural support arrangement 150 is positioned above the liquid level in the pressurizer space to position both the heater elements, sleeves and the control rod drive extensions. Within the vapor space 112, closely spaced below the closure member, there is a ring shaped header 140 containing a number of spray nozzles 142. Inlet pipes 144 connect the header 140 to the primary coolant purifying system which is not shown.

Within the downcomer space the individual superheating and vapor generating tube bundles 72A, 72B, respectively, are bottom supported by means of brackets 151. These support means permit independent movement of the tube bundles vertically due to thermal expansion.

In the downcomer space below the lower headers a pair of concentrically arranged thermal shields 152, 154, encircle the core. Dependently supported from the outer shield 154 are a series of flow directional baffles 156, 158, 160 and 162 which are located below the core.

The vessel is supported by means of a support skirt 164 connected to the vessel near its lower end. Manways 166, 168, are located in the pressure vessel wall to permit access for inspection and maintenance of the vapor-liquid separators.

In the operation of this integral boiler reactor primary coolant is supplied to the riser and downcomer spaces and also to the pressurizer space up to the level 109. Secondary coolant is supplied to the steam generating tube bundles 72B so that it fills the bundles and the separating space up to the level indicated therein. At start-up the control rods are partially removed from the core instituting a fission chain reaction and the heat developed is removed from the core by the primary coolant. Concurrently, heat is generated by the heater elements in the pressurizer space and the primary coolant within the liquid space is gradually heated and vaporized to achieve properly pressurized primary coolant for the operation of the reactor.

After the required pressure has been achieved in the pressurizer space and the primary coolant is at start-up temperature the reactor is ready to operate. It should be noted that with the combined heat from the heater elements and the core, the time period required for start-up is relatively short.

As the primary coolant is continuously heated within the core by the fission chain reaction and then cooled within the downcomer space, a natural circulation flow of the coolant is set up. The primary coolant flows upwardly through the riser space 28, then passes through the openings 29 in the barrel 18 and reversing direction flows downwardly over the vapor generating and superheating tube bundles 72B, 72A, respectively, within the downcomer space. After having been cooled by its passage over these tubes the primary coolant continues flowing downwardly between the thermal shields, pressure vessel wall and the barrel. The baffles 156, 158, 160, 162 direct and distribute the flow of primary coolant from the downcomer upwardly into the riser chamber where it again comences to flow through the core.

Secondary coolant, which is admitted to the vessel through the feedwater header 60 in the separation space 34 flows downwardly through the duct 62 thence through the vapor generating tubes 72B. With the passage of the primary coolant over the outer surface of the tubes the secondary coolant is heated to saturation temperature and a natural circulation flow is set up with the more dense cooler water flowing downwardly through the duct 62 and the less dense steam-water mixture flowing upwardly through the tubes 72B. The duct 62 delivers the incoming secondary coolant to the lower header 64 wherein it is distributed into the tubes. In addition, a small amount of the secondary coolant flows upwardly in the narrow annular space 70 between duct 62 and the sleeve 68 thereby preventing the formation of any vapor within the downcomer which would interfere with the natural circulation flow.

After its passage through the vapor generating tubes 72B wherein the secondary coolant has been heated to saturation temperature, the vapor-liquid mixture enters the upper header 69. From the upper header the vapor-liquid mixture flows through the annulus defined by conduit 74 and duct 62 and enters the flow passageway 42 in the bottom of the separation space 34. In the flow passageway 42 the vapor-liquid mixture flows through the inner and outer flow passageways 38 and 40 and enters the separators 46 through the inlet ducts 48.

Due to the whirling action imparted to the vapor-liquid mixture within the separators the vapor and liquid components are separated, with the vapor passing out through the vapor outlet 50 an the separated liquid passing downwardly and out through the separated liquid outlet 51. The separated vapor passes upwardly through the scrubber elements 52 and 54 to the upper region of the separation space where a proportionate amount of it may be drawn off through the outlet 56 as saturated steam, if desired, or alternately may enter the pipe 76 through its inlet 78. The separated liquid flows downwardly within the container 36 and enters the ducts 62, returning to the lower header 64 for recirculation through the vapor generating tubes.

If the vapor separated in the separation space is to be superheated, it passes downwardly through the pipe 76, opening 80 in the tube sheet 31 and pipe 82 to the bottom header 64A of the superheater tube bundle 72A. Within this header the vapor is distributed to the superheating tubes and flows upwardly therethrough, absorbing heat from the primary coolant and thereby being superheated before finally entering the upper superheater header 74A. From this header the superheated vapor passes through the superheated vapor outlet assembly 88 to a point of use.

To make up for the secondary coolant removed from the reactor, either as superheated steam or as saturated steam, secondary coolant feed is delivered through the inlet header 60. The header 60 is positioned within the container 36 below the separated liquid outlets 51 of the separators so that the feed and separated liquid will intermix before flowing into the downcomer ducts 62. Because of this intermixing the possibility of entrained steam remaining in the separated liquid is reduced and the natural circulation flow characteristics of the secondary fluid is enhanced.

If it is desired the unit may be arranged so that by proper regulation both saturated and superheated secondary coolant may be produced in the reactor.

During reactor operation the temperature of the primary coolant within the pressurizer space will be higher than that within the subjacent riser space though the two are interconnected by the nozzles 108. Because the pressurizer space is used to develop a particular primary coolant pressure to prevent boiling of the primary coolant within the core the primary coolant must, of necessity, be at a higher temperature within the pressurizer space. To prevent the higher temperature within the pressurizer space from adversely affecting the circulation within the riser space, the baffle 26 insulates the one from the other.

Similarly, the separation space 34 is insulated from the pressurizer space by means of the stagnant vapor space 24. During start-up a certain amount of primary coolant will find its way upwardly from the top of the downcomer space 22 between the upper section 20B of barrel 18 and the tube sheet 31 into the space 24 and will there be heated into a vapor by the heat from the pressurizer space. The stagnant vapor within this space 24 will in turn act as insulation between the separation space 34 and the pressurizer space 30 so that the heat coming from the pressurizer space will not affect the circulation of the secondary coolant in the separation space.

On shutdown, though the fission chain reaction is discontinued, there will still be a certain amount of decay heat developed within the reactor. This decay heat will heat the primary coolant which will thereafter transfer its heat to the secondary coolant. To properly cool the primary coolant the secondary coolant itself must be cooled. This is accomplished by passing the secondary coolant vapor in indirect heat transfer relationship with another cooling flud flowing through the condenser tubes 58 in the top of the separation space 34. With the reactor shutdown, neither superheated nor saturated steam is being taken for use so that the condensed vapor, now subcooled, returns to mix with the separated liquid and pass through the tubes whereby it cools the primary coolant.

During the course of operation the pressurizer maintains the primary coolant within a specific pressure range. It will be noted from FIG. 1A that there are a number of heater assemblies within the pressurizer. These assemblies are preferably divided into three groups, the control group, the back-up group and the emergency group. During normal operating procedure the control group will cycle off and on and contain sufficient load to balance steady-state heat losses. If the pressure drop of the primary coolant becomes greater than that which occurs during the normal operating procedure, the back-up group will be energized for providing the additional pressure required for stable operation. In the event a serious reduction in pressure occurs, the emergency group will also be cut in, thereby providing sufficient heat load to bring the primary coolant back to its normal pressure so that boiling or vaporization of primary coolant will not occur within the core.

On the other hand, if the pressure increases within the pressurizer, it can be reduced by spraying cool primary coolant into the vapor space 112 from the header 140 which receives its supply from the primary coolant purifying system. By the use of proper instrumentation of a type well known in the art, it will be possible to provide controls arranged either to spray cool primary coolant into the pressurizer to reduce pressure or to increase the heat input by cutting in heaters to increase pressure.

The heater assemblies are arranged so that the maximum desired pressure is developed in the minimum time period. The perforated sleeve 130 admits the primary coolant for flow over the heater elements. Since only a small quantity of primary coolant is heated within the sleeve at any one time, the vapor will be generated much more quickly thereby providing for a rapid increase in pressure. As the vapor is generated, it flows upwardly through the tube, being discharged from the sleeve in the upper portion of the vapor space 112.

By combining within a single vessel (1) the fission reaction, (2) the heat exchanger from the primary to the secondary coolant, (3) the pressurization of the primary coolant, and (4) the separation of the secondary coolant vapor-liquid mixture, a most compact unit has been provided which has many advantages over the arrangements presently used in the nuclear power plant art. Initially the over-all size of the plant is considerably reduced thereby reducing the containment requirements. The cost of the individual pieces of equipment is reduced because of their incorporation into a single vessel thereby eliminating the need for a plurality of separate container vessels. Another advantage is the very substantial reduction and even elimination of connecting piping between the various units. Still another advantage is the ability to obtain both saturated and superheated vapor from a single reactor unit.

Because the vapor generating and superheating sections of the reactor are divided into a number of individual circuits the failure in one group does not necessitate immediate shutdown of the reactor. Moreover, the ability to gain admission to the interior of the reactor through the manways 166, 168 allows access for inspection, maintenance and repair.

The arrangement of the tubes and the vertical staggering of the headers permits an optimum use of primary coolant flow as well as permitting an arrangement which does not impede the flow of coolant over the tubes. Since both the primary and secondary coolant systems use natural circulation, circulating pumps are not required. This has the obvious advantage of reducing the cost of the plant as well as avoiding problems which might arise due to pump malfunction or failure.

It will be understood that the arrangement and ratio of the vapor generating and superheating tube bundles are cited by way of example and that other dispositions and combinations of the tube bundles may be made within the scope of the invention.

While the arrangement illustrated in the drawings has the core, heat exchanger, separation equipment and pressurizer located within a single vessel, an operable arrangement within the scope of the invention could be provided if the pressurizer or the superheating portions were deleted. The primary and secondary coolants have been disclosed as employing natural circulation flow, however, it is possible that the reactor could be adapted for forced circulation on either the primary or secondary coolant side.

While in accordance with the provisions of the statutes the invention has been illustrated and described in the best form and mode of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A nuclear reactor arranged for the passage of a primary coolant through a core and then in heat exchange relationship with a secondary coolant comprising:
    (A) walls forming a vertically extending pressure vessel,
    (B) vertically arranged wall means positioned within said pressure vessel,
    (C) said wall means forming a chamber and in combination with said pressure vessel an annular shaped compartment,
    (D) a portion of said pressure vessel walls forming an annular shaped vapor-liquid separating space disposed above said compartment,
    (E) a plurality of nuclear fuel elements disposed within said wall means in the lower end of said chamber and forming a core, (F) said wall means having openings formed therethrough below the upper end thereof and above said core for the passage of the primary coolant from said chamber into said compartment, (G) a multiplicity of vertically positioned tubes disposed within said compartment and arranged for the passage therethrough of secondary coolant in heat transfer relationship with the primary coolant, (H) means for flowing secondary coolant vapor-liquid mixture from said compartment to said separating space, and (I) vapor-liquid separating means disposed within said separating space for separating the secondary coolant vapor-liquid mixture received from said compartment.

2. A nuclear reactor arranged for the passage of a primary coolant through a core and then in heat exchange relationhip with a secondary coolant comprising:

(A) plate means forming a vertically extending pressure vessel of circular cross section having a curved lower head and a removable closure member forming its upper head, (B) vertically arranged cylindrically shaped wall means disposed within and spaced for at least a portion of its height from said pressure vessel and extending upwardly from a plane closely spaced above the lower head of said pressure vessel, (C) said wall means defining a centrally arranged chamber open at its lower end, closed at its upper end and forming in combination with said pressure vessel an annular shaped downcomer space communicating with said chamber at its lower end, (D) the portion of said pressure vessel plate means located above said downcomer space, shaped to form an annular shaped hollow section providing a vapor-liquid separating space, (E) a plurality of nuclear fuel elements forming a core disposed within said wall means at a lower end of said chamber, (F) said wall means having openings formed therethrough below the upper end thereof and above said core for the passage of primary coolant from said chamber to said downcome space, (G) a multiplicity of vertically positioned tubes disposed within said downcomer space and located above said core for the passage therethrough of secondary coolant in heat exchange relationship with the primary coolant, (H) means for flowing secondary coolant vapor-liquid mixture from said tubes to said separating space, (I) vapor-liquid separating means disposed within said separating space for separating the secondary coolant vapor-liquid mixture received from the downcomer space, and (J) means for supplying separated secondary coolant liquid from said separating space to said tubes.

3. A nuclear reactor according to claim 2 wherein a horizontally positioned baffle is situated within and attached to said wall means and divides said chamber into a lower riser space and an upper pressurizer space.

4. A nuclear reactor according to claim 3 wherein said baffle is insulated and is located above said openings in said wall means, and said pressurizer space is divided into a liquid space and a vapor space by a liquid level.

5. A nuclear reactor according to claim 4 wherein a number of surge nozzles are disposed in said baffle communicating between said riser space and pressurizer space.

6. A nuclear reactor according to claim 5 wherein a number of heating elements are disposed within said pressurizer space below the liquid level therein.

7. A nuclear reactor according to claim 6 wherein a number of vertically extending sleeves are arranged within said pressurizer space and depend from said upper head downwardly to a plane closely spaced above said baffle, each of said sleeves enclosing a number of heating elements.

8. A nuclear reactor according to claim 7 wherein each of said sleeves has a number of openings along its length and a flared opening at its lower end.

9. A nuclear reactor according to claim 7 wherein a number of control rod assemblies each comprising a control rod and a drive shaft are positioned within the reactor extending downwardly through said upper head into said core, and a number of said control rod drive shafts extend through said pressurizer space within said sleeves with the heater elements disposed in the space between the drive shafts and the sleeves.

10. A nuclear reactor according to claim 6 wherein a number of spray nozzles are positioned within the vapor space of said pressurizer space.

11. A nuclear reactor according to claim 7 wherein a number of nozzle assemblies are arranged within and extend through said upper head, and each of said nozzle assemblies is connected to one of said sleeves at the inner face of said head.

12. A nuclear reactor according to claim 2 wherein said tubes are divided into a number of separate tube bundles with each bundle having its own upper header and lower header and with the tubes extending vertically between said headers.

13. A nuclear reactor according to claim 12 wherein the means for supplying secondary coolant to said tubes and the means for flowing secondary coolant vapor-liquid mixture from said tubes to said separating space comprises:

(A) a vertically arranged sleeve connected at its lower end into said lower header and at its upper end into said upper header, (B) a riser conduit extending between said upper header and the lower end of said separating space for passing secondary coolant vapor-liquid mixture from said upper header to said separating space, and (C) a downcomer pipe having its upper end located in the lower portion of said separating space below said vapor-liquid separating means and extending downwardly passing serially through said riser conduit upper header and sleeve and terminating closely above the connection of said sleeve to said lower header for delivering secondary coolant to said lower header.

14. A nuclear reactor according to claim 13 wherein said tube bundles are spaced horizontally from each other and have alternate headers staggered in spaced horizontal planes to permit the maximum number of tubes bundles within said downcomer space.

15. A nuclear reactor according to claim 14 wherein brackets are attached to the walls of said pressure vessel for supporting the lower headers of said tube bundles.

16. A nuclear reactor according to claim 12 wherein said tube bundles are divided into a group of vapor generating tube bundles and a group of superheating tube bundles and each of said bundles comprises:

(A) a vertically arranged outer sleeve extending between said upper and lower headers, and (B) a plurality of tubes extending between said upper and lower headers and encircling said sleeve.

17. A nuclear reactor according to claim 16 wherein each of said superheating tube bundles has means forming a passageway which extends from a point in said separating space above said vapor-liquid separating means downwardly so that its lower end is in communication with said lower header for supplying separated vapor from said separating space to said lower header.

18. A nuclear reactor according to claim 17 wherein said means forming the passageway in said superheater tube bundles comprises:

(A) a vertically arranged conduit disposed within said separating space with its upper end located above said vapor-liquid separating means and its lower end attached to the upper face of the section of said plate means forming the lower boundary of said separating space and in axial alignment with an opening in said section, (B) a duct attached to the lower face of said section of said plate means in axial alignment with the opening therein and extending downwardly to and connected to said upper header, and (C) an inner sleeve joined at its upper end to said duct above the upper header and forming therewith a drainable thermal sleeve at the point of attachment of said duct to said upper header and extending downwardly within said outer sleeve and terminating closely above the connection of said sleeve to said lower header.

19. A nuclear reactor according to claim 16 wherein a superheater outlet assembly delivers superheated vapor from said upper header through the wall of said pressure vessel to a point of use said superheater outlet assembly comprising:

(A) an outlet member connected to the radially outer portion of said upper header and extending therefrom through an opening formed in the adjacent wall of said pressure vessel, (B) an annular shaped forging disposed within the opening in and attached to said pressure vessel wall and encircling and bolt connected to said outlet member, (C) a flexible metallic membrane weldably attached to said outlet member and forging and sealing the joint formed therebetween, (D) an outlet flange bolt connected to said forging on the exterior of said pressure vessel and extending outwardly therefrom, and (E) a thermal sleeve having an outside diameter slightly smaller than the inside diameter of said outlet flange and outlet member, said thermal sleeve attached to the interior of said outlet flange and extending inwardly through said outlet member into said upper header and forming in combination with said outlet flange and outlet member a narrow annular shaped space for containing a body of stagnant superheated vapor.

20. A nuclear reactor according to claim 16 wherein said separating space comprises an annular shaped chamber bounded at its base by a horizontal section of said pressure vessel plate means, at its sides by a pair of upstanding radially spaced pressure vessel plate means and at its top by a rounded section attached to said radially spaced plate means.

21. A nuclear reactor according to claim 20 wherein partition means located within and closely spaced from the bottom and side walls of said annular shaped chamber form a ring shaped container open at its top and forming with the opposite walls of said annular shaped chamber a closed flow passageway.

22. A nuclear reactor according to claim 21 wherein a secondary coolant liquid level separates said container into a lower liquid space and an upper vapor space.

23. A nuclear reactor according to claim 22 wherein a number of vertically arranged whirl chamber type vapor-liquid separators are disposed within said container having the vapor outlets therefrom located above the liquid level therein and the liquid outlets located below the liquid level.

24. A nuclear reactor according to claim 23 wherein:
(A) said partition means separating said flow passageway and container has openings therethrough, and
(B) inlet ducts connected to said separators and in communication with the openings in said partition means for admitting secondary coolant vapor-liquid mixture from said flow passageway to said separators.

25. A nuclear reactor according to claim 24 wherein vapor scrubbers are positioned within the separating space above the vapor outlets from said vapor-liquid separators.

26. A nuclear reactor according to claim 25 wherein duct means positioned within said downcomer space communicate between the outlet headers of said vapor generating tube bundles and the flow passageway in said separating space for the passage of secondary coolant vapor-liquid mixture from said vapor generating tube bundles to said vapor-liquid separators.

27. A nuclear reactor according to claim 26 wherein:
(A) vertically arranged conduits are disposed within said separating space with the upper ends thereof positioned to receive separated vapor after its passage through said scrubbers, and
(B) said conduits extend downwardly into said downcomer space and are arranged therein for the delivery of the vapor to be superheated from said separating space to said superheating tube bundles.

28. A nuclear reactor according to claim 2 wherein condenser tubes are arranged within the upper end of said vapor-liquid separating space for the removal of decay heat from said reactor.

29. A nuclear reactor according to claim 2 wherein a pair of radially spaced concentrically arranged neutron shields are positioned within said downcomer space below said tubes and encircling the portion of the wall means which encloses the core.

30. A nuclear reactor according to claim 29 wherein baffles dependently supported from said neutron shields are positioned within said pressure vessel below said chamber for directing the flow of primary coolant from said downcomer space into said chamber.

31. A nuclear reactor according to claim 12 wherein the lower headers of said tube bundles are spaced above the top of said core.

32. A nuclear reactor arranged for the passage of a primary coolant through a core and then in heat exchange relationship with a secondary coolant comprising:

(A) plate means forming a vertically extending pressure vessel of circular cross section, (B) vertically arranged wall means disposed within and spaced from said pressure vessel and extending upwardly from a plane closely spaced above the lower end of said pressure vessel,
said wall means defining a centrally arranged chamber open at its lower end and forming in combination with said pressure vessel an annular shaped compartment communicating with said chamber at its lower end, and a horizontally positioned baffle situated within and attached to said wall means and dividing said chamber into a lower riser space and an upper pressurizer space, (C) a portion of said pressure vessel plate means above said annular shaped compartment having an annular shaped hollow section providing a vapor-liquid separating space, (D) said wall means having openings formed therein in the upper portion of said riser space for the passage of heated primary coolant from said riser space to said annular shaped compartment space.

(E) a plurality of whirl chamber type vapor-liquid separators disposed within said separating space, (F) a plurality of vertically extending nuclear fuel elements forming a core disposed within said riser space at the lower end of said chamber, (G) a number of bundles of vertically arranged tubes disposed within said annular spaced compartment and having the lower ends thereof positioned above the top of said core,
said bundles divided into two groups, one group of bundles comprising vapor generating tubes and the other group of bundles comprising vapor superheating tubes, said vapor generating tubes arranged to receive separated secondary coolant liquid from said separating space and to supply secondary coolant vapor-liquid mixture to said separating space, said vapor superheating tubes arranged to receive separated secondary coolant vapor from said separating space and to supply superheated vapor to a point of use, (H) said pressurizer space divided by a liquid level into a vapor space and a liquid space, heater means disposed within the liquid space of pressurizer space for heating the liquid therein, and surge nozzle disposed within said baffle and communicating between the riser space and the liquid space in said pressurizer space of said chamber.

References Cited by the Examiner

UNITED STATES PATENTS 3,012,547  12/1961  Ostergaard et al. _____ 122—32

FOREIGN PATENTS 1,164,231  10/1958  France.
1,265,483   5/1961  France.
  800,385   8/1958  Great Britain.
  286,658   3/1953  Switzerland.

REUBEN EPSTEIN, *Primary Examiner.*

CARL D. QUARFORTH, *Examiner.*